United States Patent
Luehrsen et al.

(10) Patent No.: US 9,599,075 B2
(45) Date of Patent: Mar. 21, 2017

(54) BIDIRECTIONAL VALVED ASPIRATOR FOR SURGE CONTROL AND VACUUM GENERATION

(71) Applicant: Ford Global Technologies, LLC, Dearborn, MI (US)

(72) Inventors: Eric Luehrsen, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 648 days.

(21) Appl. No.: 14/102,133

(22) Filed: Dec. 10, 2013

(65) Prior Publication Data

US 2015/0159601 A1    Jun. 11, 2015

(51) Int. Cl.
  *F02B 33/44* (2006.01)
  *F02B 33/00* (2006.01)
  *F02M 35/10* (2006.01)

(52) U.S. Cl.
  CPC  *F02M 35/10118* (2013.01); *F02M 35/10229* (2013.01)

(58) Field of Classification Search
  CPC ........ F02M 35/10118; F02M 35/10229; F02B 37/16
  USPC ............................................ 60/611; 123/564
  See application file for complete search history.

(56) References Cited

U.S. PATENT DOCUMENTS

| | | | |
|---|---|---|---|
| 6,463,810 B1 | 10/2002 | Liu | |
| 6,470,864 B2 | 10/2002 | Kim et al. | |
| 7,299,707 B1 | 11/2007 | Evans | |
| 9,382,882 B2 * | 7/2016 | Pursifull | F02M 35/10118 |
| 2005/0262937 A1 | 12/2005 | Emmert, Jr. et al. | |
| 2011/0132311 A1 * | 6/2011 | Pursifull | F02M 35/10229 123/184.56 |
| 2015/0083094 A1 * | 3/2015 | Pursifull | F02M 35/10229 123/559.1 |

(Continued)

OTHER PUBLICATIONS

Pursifull, Ross Dykstra, "Parallel Aspirator Arrangement for Vacuum Generation and Compressor Bypass," U.S. Appl. No. 14/038,497, filed Sep. 26, 2013, 53 pages.

(Continued)

*Primary Examiner* — Nicholas J Weiss
*Assistant Examiner* — Ngoc T Nguyen
(74) *Attorney, Agent, or Firm* — Julia Voutyras; John D. Russell; B. Anna McCoy (57) ABSTRACT

An aspirator coupled between an inlet of a compressor and an engine intake manifold may include sonic/supersonic expansion curves for both forward and reverse flow through the aspirator. Suction flow may enter a first entraining port coupling an ambient side of the aspirator with a vacuum source during reverse flow through the aspirator, whereas suction flow may enter a second entraining port coupling a manifold side of the aspirator with the vacuum source, the first entraining port counter sunk relative to a nominal slope of the aspirator to reduce flow disruption caused by the port during forward flow through the aspirator. A radial-flow aspirator shut-off valve arranged in series with the aspirator may be controlled to enable or disable motive flow through the aspirator, and motive flow may enter the valve in a direction perpendicular to a motive flow axis of the aspirator when the valve is open.

10 Claims, 6 Drawing Sheets

(56) References Cited

U.S. PATENT DOCUMENTS

| | | | |
|---|---|---|---|
| 2015/0114348 A1* | 4/2015 | Pursifull | F02M 35/10229 |
| | | | 123/445 |
| 2015/0114350 A1* | 4/2015 | Pursifull | F02M 35/10229 |
| | | | 123/445 |
| 2015/0204283 A1* | 7/2015 | VanDerWege | F02M 35/10229 |
| | | | 123/445 |

OTHER PUBLICATIONS

Luehrsen, Eric, "Vacuum Scavenging in Hybrid Vehicles," U.S. Appl. No. 14/098,385, filed Dec. 15, 2013, 42 pages.

* cited by examiner

BIDIRECTIONAL VALVED ASPIRATOR FOR SURGE CONTROL AND VACUUM GENERATION

FIELD

The present application relates to a bidirectional valved aspirator bypassing an intake compressor in an engine system. In one example, a motive flow rate through the aspirator may be controlled via control of an aspirator shut-off valve to provide vacuum generation during non-boost conditions, and to provide compressor recirculation flow while generating vacuum during boost conditions.

BACKGROUND AND SUMMARY

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the compressor can fluctuate to levels that may result in noise disturbances, and in more severe cases, performance issues and compressor degradation. Such compressor surge may be mitigated by one or more compressor bypass valves (CBVs). The CBVs may recirculate compressed air from the compressor outlet to the compressor inlet, and thus may be arranged in a passage which is coupled to the intake upstream of the compressor and downstream of the compressor in some examples. In some examples, continuous CBVs (CCBVs) may be used, which provide a continuous and continually variable circulation flow from downstream of the compressor to upstream of the compressor. CCBVs may provide boost control and compressor surge avoidance, and may further prevent objectionable audible noise. However, incorporation of such valves can add significant component and operating costs to engine systems.

Engines may also include one or more aspirators may be coupled in an engine system to harness engine airflow for generation of vacuum, for use by various vacuum consumption devices that are actuated using vacuum (e.g., a brake booster). Aspirators (which may alternatively be referred to as ejectors, venturi pumps, jet pumps, and eductors) are passive devices which provide low-cost vacuum generation when utilized in engine systems. An amount of vacuum generated at an aspirator can be controlled by controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters.

While aspirators may generate vacuum at a lower cost and with improved efficiency as compared to electrically-driven or engine-driven vacuum pumps, it may be necessary to include an aspirator shut-off valve to regulate flow through the aspirator. By controlling the opening amount of the valve, the amount of air flowing through the aspirator and the air flow rate can be varied, thereby adjusting vacuum generation as engine operating conditions such as intake manifold pressure change. However, again, adding valves to engine systems can add significant component and operating costs. Further, while a door or gate of a typical aspirator shut-off valve may open easily during one direction of flow through the valve, flow in the opposite direction may exert force in a direction opposing the opening of the door or gate, which may negatively impact operation of the valve and/or increase the amount of energy required to open the valve.

Further, typically, aspirators are designed with a sonic/supersonic expansion curve in one direction and with a single entraining port to harness vacuum generated as the motive flow passes through the converging-diverging nozzle of the aspirator. To reduce manufacturing costs, the port may be created via injection molding, and may have sharp edges (e.g. edges perpendicular to a motive flow axis of the aspirator) due to the insertion of the injection molding tool which forms the port. Reverse flow through such an aspirator may not achieve the same sonic/supersonic expansion due to flow disruption caused by the sharp edges of the port, as well as due to the aspirator being designed for sonic/supersonic expansion for only one direction of flow.

To address at least some of the above issues, the inventors herein have recognized that an aspirator coupling an inlet of a compressor with an intake manifold may include a first entraining port coupling an ambient side of the aspirator with a vacuum source and a second entraining port coupling a manifold side of the aspirator with the vacuum source, and may be designed such that both of an expansion curve from an ambient side to a manifold side of the aspirator and an expansion curve from the manifold side to the ambient side of the aspirator are sonic/supersonic expansion curves. For example, the expansion curve from the manifold side to the ambient side of the aspirator may be tuned to mass flow densities near a typical boost condition of the engine. Accordingly, the aspirator may function as a vacuum-generating CBV during boost conditions, such that a dedicated CBV may be omitted from the engine system so as to advantageously reduce component and manufacturing costs. To minimize flow disruption which might otherwise result from the incorporation of an extra entraining port in the aspirator, the first entraining port may be counter sunk relative to a nominal slope of the aspirator, and a side of the first entraining port closer to a throat of the aspirator may be proud relative to a nominal slope of the aspirator.

Further, the inventors herein have recognized that bidirectional flow through the aspirator may be enhanced by the use of a radial-flow aspirator shut-off valve. Whereas motive flow may enter typical aspirator shut-off valves without diverging from a motive flow path through the aspirator (e.g., a door or gate of these valves may open such that motive flow may enter an opening which is coaxial with a motive flow axis of the aspirator), motive flow may enter a radial-flow shut-off valve in a direction perpendicular to a direction of motive flow through the aspirator. Accordingly, using a radial-flow shut-off valve may reduce energy consumption of the valve as well as flow disruption/backpressure which may occur when non-radial-flow aspirator shut-off valves are used.

Therefore, some of the technical results achieved by the engine systems and methods described herein include reduced manufacturing and component costs due to the omission of a dedicated CBV, reduced energy consumption due to the use of a radial-flow aspirator shut-off valve, and vacuum generation during boost and non-boost conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
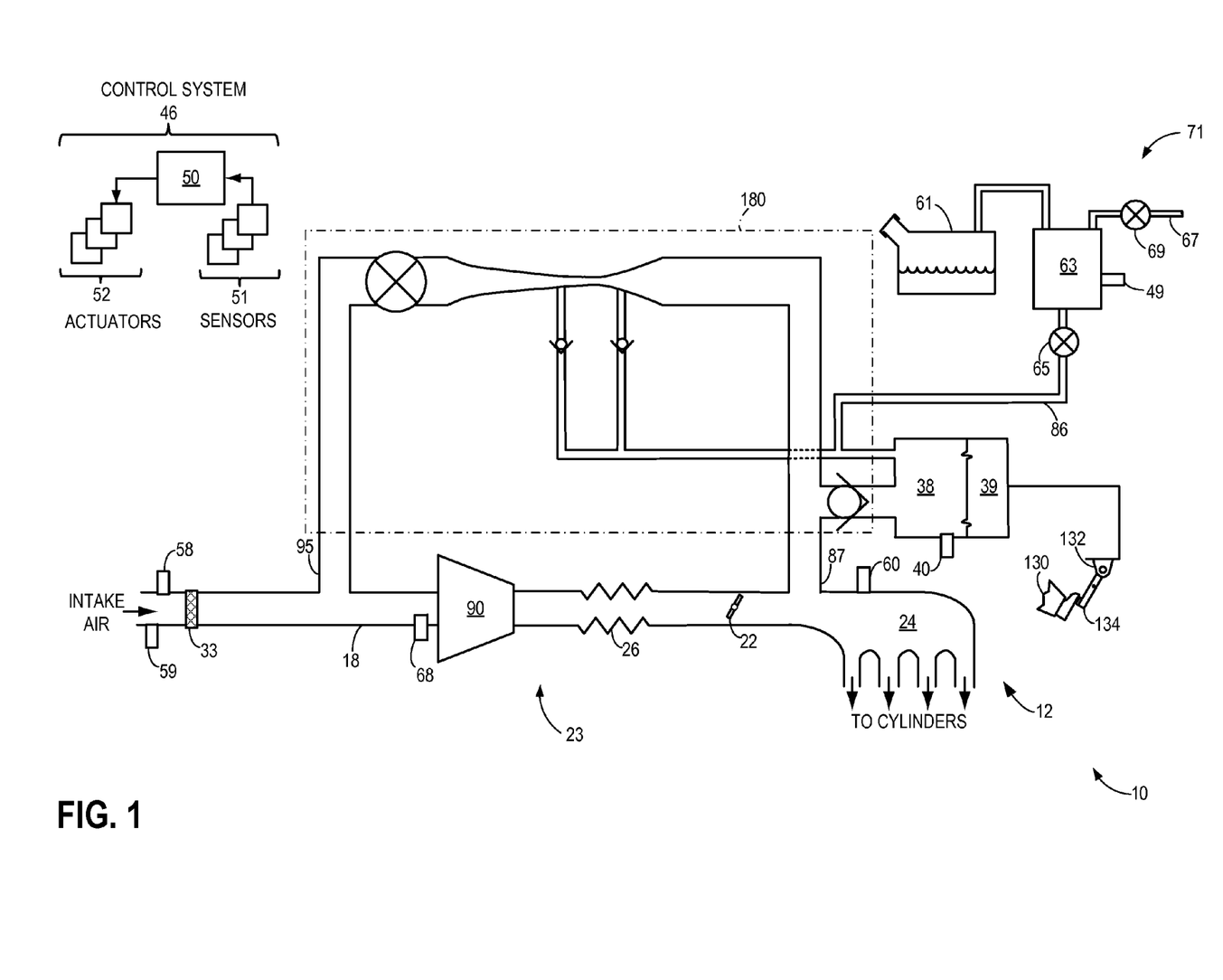
FIG. 1 shows a schematic diagram of a first embodiment of an example engine system including a bidirectional valved aspirator bypassing a boost device.
Figure 2:
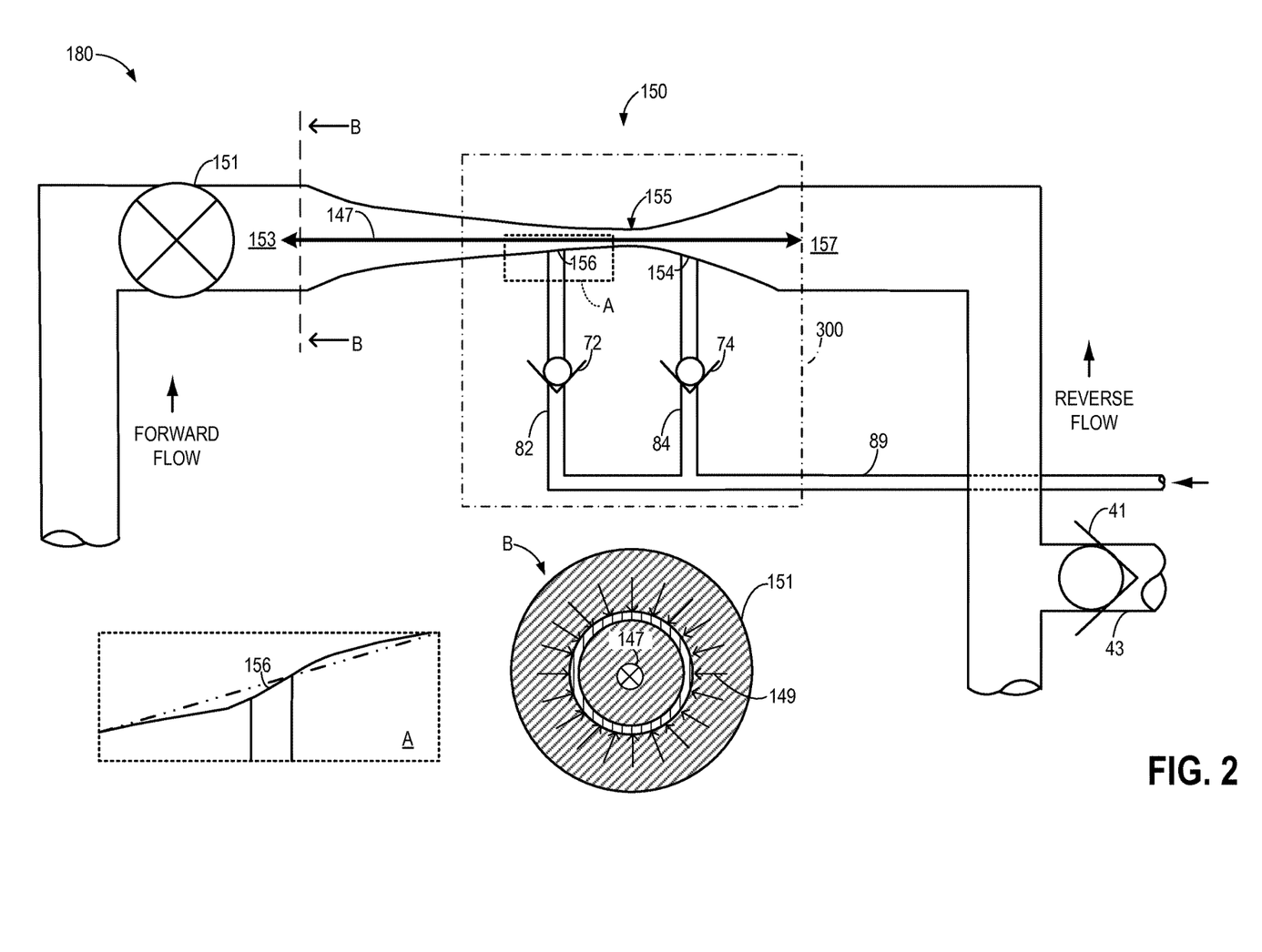
FIG. 2 shows a detailed schematic view of bidirectional valved aspirator with two suction ports which may be included in the engine system of FIG. 1, including a detail view A of an ambient-side entraining port of the aspirator and a sectional view B showing a cross section of the aspirator arrangement immediately downstream of a radial-flow aspirator shut-off valve.
Figure 3A:
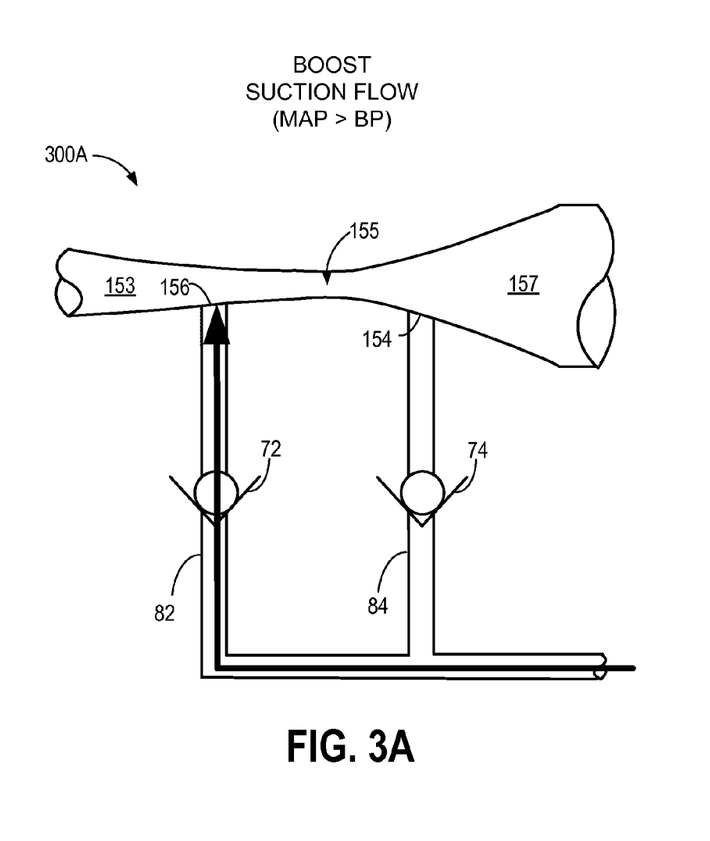
FIG. 3A shows a detailed schematic view of suction flow into the bidirectional valved aspirator of FIG. 2 during boost conditions.
Figure 3B:
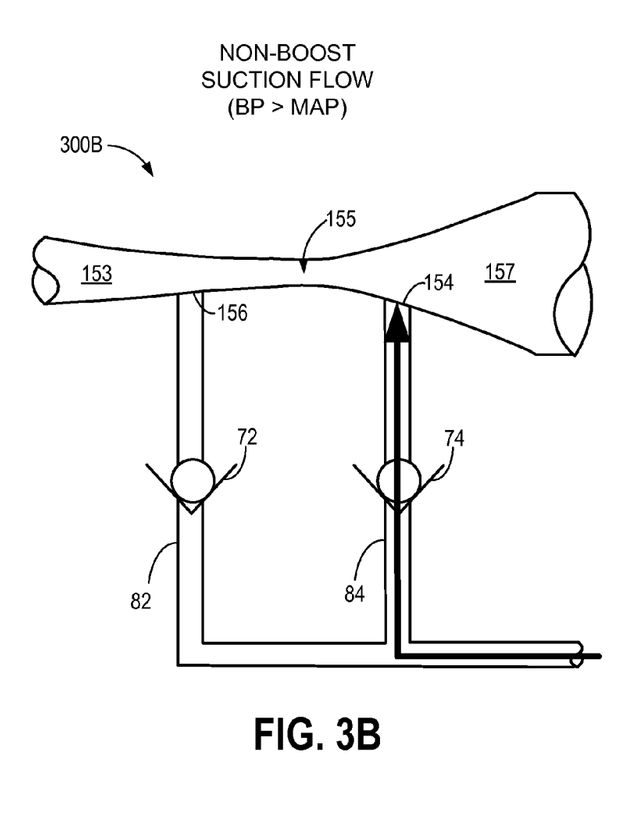
FIG. 3B shows a detailed schematic view of suction flow into the bidirectional valved aspirator of FIG. 2 during non-boost conditions.

Methods and systems are provided for controlling a motive flow rate through a bidirectional valved aspirator bypassing a boost device arranged in an intake of an engine system such as the engine system depicted in FIG. 1. A detail view of an exemplary aspirator which may be included in the engine system of FIG. 1 is provided in FIG. 2, and a detail view of the aspirator of FIG. 2 during boost conditions and non-boost conditions is shown in FIGS. 3A and 3B, respectively. Depending on engine operating conditions, whether throttle fault conditions are present, and whether boost is active, various controls may be enacted to achieved a desired flow rate through a bidirectional valved aspirator (e.g., see the method of FIG. 4). For example, a desired motive flow rate through a bidirectional valved aspirator may be determined in accordance with the method of FIG. 5 during non-boost conditions, and in accordance with the method of FIG. 6 during boost conditions. The desired combined motive flow rate through the aspirator arrangement may depend upon vacuum replenishment needs and MAP during non-boost conditions, whereas it may depend upon vacuum replenishment needs and a level of current or anticipated compressor surge during boost conditions. A state/position of an aspirator shut-off valve (ASOV) arranged in series with the bidirectional aspirator may then be controlled to achieve the desired motive flow rate, for example in the manner depicted in the method of FIG. 7.

Turning to FIG. 1, it shows a first embodiment of an engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 includes a control system 46. Control system 46 includes a controller 50, which may be any electronic control system of the engine system or of the vehicle in which the engine system is installed. Controller 50 may be configured to make control decisions based at least partly on input from one or more sensors 51 within the engine system, and may control actuators 52 based on the control decisions. For example, controller 50 may store computer-readable instructions in memory, and actuators 52 may be controlled via execution of the instructions.

Engine 12 includes an engine intake system 23. Intake system 23 includes a main air intake throttle 22 fluidly coupled to an engine intake manifold 24 along an intake passage 18. Air may enter intake passage 18 from an air intake system including an air filter 33 in communication with the vehicle's environment. A position of main throttle 22 may be varied by controller 50 via a signal provided to an electric motor or actuator included with the main throttle 22, a configuration that is commonly referred to as electronic throttle control. In this manner, main throttle 22 may be operated to vary the intake air provided to the intake manifold and the plurality of engine cylinders from downstream of a boosting device, and to vary the proportion of intake air flowing back to the intake passage upstream of the boosting device during certain conditions, as will be detailed below.

Whereas motorized throttles are often designed to default to a 6° or 7° open position when unpowered, for example so that the engine may receive enough air flow to complete a current trip even in the case of failure of the electronic throttle control (sometimes referred to as "limp home" operation), throttle 22 may have a fully closed default position. A fully closed default position may be used in conjunction with the bidirectional valved aspirator described herein because the motive flow through the aspirator may be sufficient in the case of electronic throttle control failure. In this way, the costly partially open unpowered position of the throttle may be eliminated.

In the example embodiment shown in FIG. 1, mass air flow (MAF) sensor 58 is coupled in intake passage 18 for providing signals regarding mass air flow in the intake passage to controller 50. In the depicted example, MAF sensor 58 provides a signal regarding mass air flow at the inlet of intake passage 18, upstream of air filter 33. However, it will be appreciated that the MAF sensors may be coupled elsewhere in the intake system or engine system, and further, there may be a plurality of MAF sensors arranged in the intake system or engine system.

A sensor 60 may be coupled to intake manifold 24 for providing a signal regarding manifold air pressure (MAP) and/or manifold vacuum (MANVAC) to controller 50. For example, sensor 60 may be a pressure sensor or a gauge sensor reading vacuum, and may transmit data as negative vacuum (e.g., pressure) to controller 50. A sensor 59 may be coupled to intake passage 18 upstream of the compressor, for providing a signal regarding barometric pressure (BP) to controller 50. A compressor inlet pressure (CIP) sensor 68 may be arranged downstream a junction of intake passage 18 and passage 95 and upstream of the compressor. CIP sensor 68 may provide a signal regarding CIP to controller 50.

In some examples, additional pressure/vacuum sensors may be coupled elsewhere in the engine system to provide signals regarding pressure/vacuum in other areas of the engine system to controller 50.

As shown, engine system 10 is a boosted engine system including a boosting device. In the present example, the boosting device is a compressor 90 for boosting an intake air charge received along intake passage 18. A charge air cooler (or intercooler) 26 is coupled downstream of compressor 90 for cooling the boosted air charge before delivery to the intake manifold. In embodiments where the boosting device is a turbocharger, compressor 90 may be coupled to and driven by an exhaust turbine (not shown). Further, compressor 90 may be, at least in part, driven by an electric motor or the engine crankshaft.

Engine system 10 further includes a fuel vapor purge system 71. Fuel vapor purge system 71 includes fuel tank 61, which stores a volatile liquid fuel combusted in engine 12. To avoid emission of fuel vapors from the fuel tank and into the atmosphere, the fuel tank is vented to the atmosphere through fuel vapor canister 63. The fuel vapor canister may contain adsorbent material with a significant capacity for storing hydrocarbon-, alcohol-, and/or ester-based fuels in an adsorbed state; it may be filled with activated carbon granules and/or another high surface-area material, for example. Nevertheless, prolonged adsorption of fuel vapor will eventually reduce the capacity of the fuel vapor canister for further storage. Therefore, the fuel vapor canister may be periodically purged of adsorbed fuel, as further described hereinafter. In the configuration shown in FIG. 1, canister purge valve 65 controls the purging of fuel vapors from the canister into the intake manifold along a suction passage 86 coupled to entraining inlets of a bidirectional aspirator, as will be described below.

When purging conditions are met, such as when the canister is saturated, vapors stored in fuel vapor canister 63 may be purged to the intake system (either to the intake passage upstream of the compressor or to intake manifold 24, depending on the direction of flow through the bidirectional aspirator) by opening canister purge valve 65, during conditions where a valve controlling flow through the aspirator is open. While a single canister 63 is shown, it will be appreciated that any number of canisters may be coupled in engine system 10. In one example, canister purge valve 65 may be a solenoid valve wherein opening or closing of the valve is performed via actuation of a canister purge solenoid. It will be appreciated that valve 65 may be controlled based on pressure differentials within the engine system; for example, valve 65 may be closed when the pressure in passage 89 is greater than the pressure in vapor purge system 71 to prevent backflow from passage 89 to vapor purge system 71. The pressure in passage 89 may be determined based on a signal from a pressure sensor arranged in passage 89, or alternatively, the pressure in passage 89 may be inferred based on signals from various sensors within the engine system and/or based on engine operating conditions. Additionally or alternatively, a check valve may be arranged in passage 86 to prevent backflow.

Canister 63 further includes a vent 67 for routing gases out of the canister 63 to the atmosphere when storing, or trapping, fuel vapors from fuel tank 26. Vent 67 may also allow fresh air to be drawn into fuel vapor canister 63 when purging stored fuel vapors to intake system via passage 86. While this example shows vent 67 communicating with fresh, unheated air, various modifications may also be used. Vent 67 may include a canister vent valve 69 to adjust a flow of air and vapors between canister 63 and the atmosphere. As shown, a pressure sensor 49 may be arranged in canister 63 and may provide a signal regarding the pressure in the canister to controller 50. In other examples, pressure sensor 49 may be arranged elsewhere, for example in passage 86.

Engine system 10 further includes a bidirectional valved aspirator arrangement 180. In the depicted embodiment, bidirectional valved aspirator arrangement 180 includes an aspirator 150, which may be an ejector, aspirator, eductor, jet pump, or similar passive device. As compared to aspirators incorporated in engine systems to generate vacuum during non-boost conditions alone, aspirator 150 may be relatively large so as to accommodate a high level of reverse motive flow which may occur during compressor surge.

A passage 95 couples aspirator arrangement 180 with intake passage 18 at a point downstream of air filter 33 and upstream of compressor 90. Further, as shown in FIG. 1, a passage 87 couples aspirator arrangement 180 with intake manifold 24. Aspirator 150 is a three-port device including an ambient-side motive port, a manifold-side motive port, an ambient-side entraining port, and a manifold-side entraining port. For example, as may be seen in the detail view of FIG. 2, aspirator 150 may include an ambient-side motive port 153, a manifold-side motive port 157, an ambient-side entraining port 156, and a manifold-side entraining port 154. As described further below, motive flow through the aspirator generates suction flow at one of the entraining ports of the aspirator (depending on the motive flow direction), thereby generating vacuum, e.g. which may be stored in a vacuum reservoir and provided to various vacuum consumers of the engine system. Aspirator 150 may have a flow geometry which enables vacuum generation during motive flow in both directions: motive flow from the ambient-side motive port to the manifold-side motive port (which may be referred to as "forward flow" through the aspirator) may generate vacuum by inducing suction flow into the manifold-side entraining port, whereas motive flow from the manifold-side motive port to the ambient-side motive port (which may be referred to as "reverse flow" through the aspirator) may generate vacuum by inducing suction flow into the ambient-side entraining port. For example, as seen in FIG. 2, the aspirator may have a converging-diverging geometry comprising two substantially frustoconical sections arranged coaxially and joined together at their respective narrowest-diameter ends to form a single integral converging-diverging venturi tube. A region where the two narrowest-diameter ends of the frustoconical sections are joined together may be referred to as a throat 155 of aspirator; the maximum constriction of motive flow through aspirator 150 may occur at throat 155, as throat 155 may be the point at which the flow diameter of the aspirator is the narrowest.

The converging portion of typical aspirators, which are designed for cheap and fast manufacture and for use in systems with unidirectional flow, may have the shape of a square-cornered funnel. However, such a flow geometry may not be appropriate for the bidirectional aspirator described herein, which must achieve desired operation during both forward and reverse motive flow. For example, the bidirectional aspirator described herein may require a sonic/supersonic expansion curve for flow in both directions. The curve for the ambient (converging) portion of the aspirator may need to be carefully tuned to mass flow densities near the engine's typical boost condition, due to the function of this portion of the aspirator during reverse flow through the aspirator (which may occur during boost conditions depending of the state of the ASOV). In one example, the engine's typical boost condition may include a 1.0 to 1.5 L turbocharged engine propelling a midsize vehicle at 100 kilometers per hour.

It will be appreciated that in order to generate vacuum over ambient during reverse flow through the aspirator, significant boost may be required to generate adequate flow velocity on the expansion side. The amount of boost required and the amount of boost which is regularly available are dependent on the engine and the vehicle being used. For a large vehicle with a low displacement engine, the vehicle will be operated with maximum boost often, and thus tuning the ambient portion of the aspirator may be a one-step process in that the design may be based on a air at a single density exiting an orifice expanding supersonically. For a vehicle with moderate displacement, however, the manufacturing process must place any matching seam on the engine (e.g. manifold) side of the aspirator and must avoid bur incursion into flow (e.g., bur incursion which may occur when typical injection molding is performed). Further, in such a vehicle, the shape of the orifice exit may need to be designed such that is maintains ideal expansion of the common boost level during cruise conditions (e.g., when traveling at 40-60 miles per hour on a level road). As brute force sonic flow may not be guaranteed, it may be necessary to only tune for vacuum gain during moderate accelerations.

In the depicted example, an ambient side frustoconical section of the aspirator has a first length representing a distance from its widest-diameter portion to its narrowest-diameter portion. Similarly, a manifold side frustoconical section of the aspirator has a second length representing the distance from its widest-diameter portion to its narrowest-diameter portion, and the first length may be greater than the second length, as shown in FIG. 2. Further, the sides of the frustoconical section forming the converging portion of the aspirator are oriented at a first angle from a motive flow axis 147 of the aspirator, whereas the sides of the frustoconical section forming the diverging portion of the aspirator are oriented at a second angle from motive flow axis 147, and the second angle may be greater than the first angle. Such a design may advantageously provide a sonic/supersonic expansion curve for flow in both directions (e.g., both forward and reverse flow) through the aspirator. However, other flow geometries of aspirator 150 which enable vacuum generation during both forward and reverse flow through the aspirator may also be used without departing from the scope of this disclosure.

As noted above, aspirator 150 includes an ambient-side entraining port 156 and a manifold-side entraining port 154. Ambient-side entraining port 156 may be positioned on the ambient side of throat 155 of aspirator 150. As noted above, the flow diameter at throat 155 may constitute the smallest flow diameter of the aspirator, and thus throat 155 may be described as being the narrowest point of the aspirator.

As detailed below, during boost conditions, suction flow may enter ambient-side entraining port 156 whereas suction flow may not enter manifold-side entraining port 154, due to the behavior of reverse motive flow through the aspirator resulting from the particular flow geometry of the aspirator, as well as the entraining port placement and design. Ambient-side entraining port 156 may be positioned in a region where reverse motive flow through the aspirator is supersonic, or just before reverse motive flow through the aspirator falls out of sonic. Such positioning of port 156 may achieve the lowest possible static/dynamic pressure combination. In contrast, manifold-side entraining port 154 may be positioned on the manifold side of throat 155 of aspirator 150, closer to the narrowest-diameter portion of the diverging frustoconical section of the aspirator than to the widest-diameter portion of the diverging frustoconical section of the aspirator. For example, port 154 may be positioned near throat 155, but no so near to throat 155 as to disturb flow dynamics during boost conditions.

As further detailed below, during conditions where the engine is naturally aspirated (non-boost conditions), suction flow may enter manifold-side entraining port 154 whereas suction flow may not enter ambient-side entraining port 156, due to the behavior of forward motive flow through the aspirator resulting from the particular flow geometry of the aspirator, as well as the entraining port placement and design of the aspirator.

Typical aspirator entraining ports may be designing for cheap and fast manufacture, and for use in systems with unidirectional flow (e.g. flow from ambient to the intake manifold but not flow from the intake manifold to ambient). Accordingly, such entraining ports may be designed with square edges for tooling simplicity, for example such that the port is oriented perpendicular to the motive flow axis (e.g., center line) of the aspirator. Further, in such aspirators, there may be a single entraining port arranged on the "down wind" draft (e.g., on the manifold side of the throat), near the center of the diverging section. However, this design may be disadvantageous in the context of bidirectional aspirators which receive reverse flow during certain operating conditions (e.g., boost). For example, during borderline conditions where boost is relatively low (such that less motivating energy drives the reverse flow through the aspirator), the sharp edges of ports created by injection molding slide interfaces may seriously upset motive flow and vacuum generation. Accordingly, because the aspirator arrangement described herein operates under both forward and reverse motive flow, it may be necessary to utilize a design wherein the ambient-side entraining port is oriented off-perpendicular to the aspirator's motive flow axis. For example, as noted above, the inventors herein have recognized that it may be advantageous to "counter sink" the entraining port(s) relative the nominal slope of the aspirator and to ensure that the side of the port(s) near the aspirator throat is slightly proud relative to the nominal slope of the aspirator. Such a design may be utilized on one or both of the ambient-side and manifold-side entraining ports. In the design is utilized on both of the entraining ports, it may be more pronounced for one port than for the other port. That is, one port may be "counter sunk" to a greater extent as opposed to the other port, and the throat side of one port may be more proud relative to the nominal slope of the aspirator as compared to the throat side of the other port. For example, the inventors herein have recognized that the potential flow disruption caused by the ambient-side entraining port 156 during forward flow through the aspirator (e.g., when is not serving as a suction port) may be greater than the potential flow disruption caused by the manifold-side entraining port 154 due to the flow geometry of the aspirator in the embodiment depicted herein. Accordingly, in the embodiment depicted in FIG. 2, ambient-side entraining port 156 is counter sunk to a greater extent as compared to manifold-side entraining port 154, and the throat side of ambient-side entraining port 156 is more proud relative to the nominal slope of aspirator 150 as compared to the throat side of manifold-side entraining port 154.

Detail A of FIG. 2 provides a zoomed-in view of ambient-side entraining port 156. As shown in detail A, there may be a "defect" in the slope of the portion of the aspirator which reduces the sharpness of the edges of port 156. The dash-dot line in detail A represents an aspirator slope without such a defect, alternatively referred to herein as the nominal or base slope of the aspirator. Whereas the non-defective aspirator slope would result in port 156 having sharp, potentially flow-disrupting edges, the depicted defective aspirator slope enables optimal flow during reverse flow through the aspirator (e.g., during boost conditions) by minimizing flow disruption that might otherwise occur. While such a design may increase manufacturing costs, and may require the aspirator to maintain its overall shape during shrinkage after molding, it may advantageously enable vacuum generation during both forward and reverse flow through the aspirator. Similarly, because of the higher potential for flow disruption during reverse flow through the aspirator (e.g., during low boost), it may be preferable to ensure that any necessary manufacturing errata such as edges and burs occur at the manifold side rather than the ambient side of the aspirator.

While manifold-side entraining port 154 may potentially disrupt reverse flow through the aspirator (e.g., when it is not serving as a suction port), the location of this port within the manifold-side section of the aspirator may have a more profound impact on flow dynamics than does the port design (e.g., the extent to which the aspirator's slope in the region of the port differs from the base slope of the aspirator). For example, while a detail view is not provided, port 154 of FIG. 2 may be designed similar to port 156 in that port 154 may be counter sunk to some extent relative to the nominal slope of the aspirator, and further, the side of port 154 near the aspirator throat may be slightly proud relative to the nominal slope of the aspirator. However, port 154 may be counter sunk to a lesser extent as compared to the extent to which port 156 is counter sunk, and the side of port 154 near throat 155 may be less proud as compared to the side of port 156 near throat 155.

In other examples, such as examples where injection molding must be used to form the aspirator entraining ports, a more typical perpendicular sharp-edged port design may be sufficient to maintain dynamic pressure drop during boost conditions.

In the example embodiment depicted in FIGS. 1-2, ambient-side entraining port 156 and manifold-side entraining port 154 both communicate with a vacuum reservoir 38. As shown, a passage 82 coupled with ambient-side entraining port 156 may merge with a passage 84 coupled with manifold-side entraining port 154 upstream of vacuum reservoir 38. Due to the converging-diverging shape of aspirator 150 which harnesses the venturi effect when motive flow therethrough, forward or reverse motive flow of fluid such as air through the aspirator may generate a low pressure at throat 155 of aspirator 150. As will be detailed below, depending on engine operating conditions, this low pressure may induce suction flow from passage 82 or passage 84 into throat 155 of aspirator 150, thereby generating vacuum at vacuum reservoir 38.

A check valve 72 arranged in passage 82 prevents backflow from aspirator 150 to vacuum reservoir 38 via ambient-side entraining port 156, thereby allowing vacuum reservoir 38 to retain its vacuum should the pressures at the ambient-side motive port 153 of aspirator 150 and the vacuum reservoir equalize. Similarly, a check valve 74 arranged in passage 84 prevents backflow from aspirator 150 to vacuum reservoir 38 via manifold-side entraining port 154, thereby allowing vacuum reservoir 38 to retain its vacuum should the pressures at the manifold-side motive port 157 of aspirator 150 and the vacuum reservoir equalize. While the depicted embodiment shows check valves 72 and 74 as distinct valves, in alternate embodiments, one or both of check valves 72 and 74 may be integrated into the aspirator.

It will be appreciated that because manifold-side motive port 157 communicates with intake manifold 24, check valves 72 and 74 prevent fluid flow from the intake manifold to the vacuum reservoir, e.g. which might otherwise occur during conditions when intake manifold pressure is higher than a pressure in the vacuum reservoir. Similarly, check valves 72 and 74 prevent fluid such as an intake air charge from flowing from passage 95 into vacuum reservoir 38. As shown in FIG. 1, passages 82 and 84 merge into a common passage 89 upstream of vacuum reservoir 38. Passage 89 is fluidly coupled with vacuum reservoir 38. Further, depending on a state of canister purge valve 65, passage 89 may be fluidly coupled with canister 63 of vapor purge system 71. However, in other examples, passages 82 and 84 may each enter the vacuum reservoir at different ports.

Vacuum reservoir 38 may be coupled to one or more engine vacuum consumption devices 39. In one non-limiting example, a vacuum consumption device 39 may be a brake booster coupled to vehicle wheel brakes wherein vacuum reservoir 38 is a vacuum cavity in front of a diaphragm of the brake booster, as shown in FIG. 1. In such an example, vacuum reservoir 38 may be an internal vacuum reservoir configured to amplify a force provided by a vehicle operator 130 via a brake pedal 134 for applying vehicle wheel brakes (not shown). A position of the brake pedal 134 may be monitored by a brake pedal sensor 132. In alternate embodiments, the vacuum reservoir may be a low pressure storage tank included in a fuel vapor purge system (such as vapor purge system 71, for example), a vacuum reservoir coupled to a turbine wastegate, a vacuum reservoir coupled to a charge motion control valve, etc. In such embodiments, vacuum consumption devices 39 of the vehicle system may include various vacuum-actuated valves such as charge motion control valves, a 4×4 hub lock, switchable engine mounts, heating, ventilation and cooling, vacuum leak checks, crankcase ventilation, exhaust gas recirculation, gaseous fuel systems, wheel-to-axle disconnect, etc. In one example embodiment, anticipated vacuum consumption by the vacuum consumers during various engine operating conditions may be stored in a lookup table in memory of the control system, for example, and the stored vacuum threshold corresponding to anticipated vacuum consumption for current engine operating conditions may be determined by referencing the lookup table. In some embodiments, as depicted, a sensor 40 may be coupled to the vacuum reservoir 38 for providing an estimate of the vacuum level at the reservoir. Sensor 40 may be a gauge sensor reading vacuum, and may transmit data as negative vacuum (e.g., pressure) to controller 50. Accordingly, sensor 40 may measure the amount of vacuum stored in vacuum reservoir 38.

As shown in FIGS. 1-2, vacuum reservoir 38 may be directly or indirectly coupled to intake manifold 24 via a check valve 41 arranged in a bypass passage 43. As shown, bypass passage 43 may have a relatively large diameter; for example, bypass passage 43 may be the same size as passage 87 which couples the manifold-side motive port of aspirator 150 with the intake manifold, and an SAE standard ½" pipe may be used for these passages. Check valve 41 may allow air to flow to intake manifold 24 from vacuum reservoir 38 and may limit air flow from intake manifold 24 to vacuum reservoir 38. During conditions where the intake manifold pressure is negative, the intake manifold may be a vacuum source for vacuum reservoir 38. For example, during engine idle conditions, pressure in the vacuum reservoir may be higher than pressure in the intake manifold and this may cause the vacuum reservoir (e.g., the brake booster) to "dump" fluid into the intake manifold, which may serve to generate vacuum in the vacuum reservoir. In examples where vacuum consumption device 39 is a brake booster, inclusion of the bypass passage 43 in the system may ensure that the brake booster is evacuated nearly instantaneously whenever intake manifold pressure is lower than brake booster pressure. In contrast, during conditions such as wide open throttle (WOT) when intake manifold pressure is close to ambient pressure (e.g., only 1" mercury below ambient), the pressure differential between the vacuum reservoir and the intake manifold may not be sufficient to induce fluid flow from the vacuum reservoir to the intake manifold via bypass passage 43. While the depicted embodiment shows bypass passage 43 coupled with passage 87, other direct or indirect couplings of the intake manifold and the vacuum reservoir are also anticipated.

As described herein, an ASOV may be controlled to enable or disable motive flow through aspirator 150. In the embodiment depicted in FIGS. 1-2, an ASOV 151 is arranged in series with and upstream of aspirator 150. Specifically, ASOV 151 is arranged in passage 95 upstream of ambient-side motive port 153 of aspirator 150. However, it will be appreciated that in other embodiments, the ASOV may be arranged in series with and downstream of manifold-side motive port 157 of aspirator 150, or the ASOV may be integral to the aspirator (e.g., the ASOV may be arranged at the throat of the aspirator). One advantage of positioning an ASOV upstream of the ambient-side motive port of the aspirator is that when the ASOV is upstream (e.g., during forward flow through the aspirator), the pressure loss associated with the ASOV has less of an impact as compared to a configuration where the ASOV is downstream of the aspirator (either positioned in series with the manifold-side motive port of the aspirator during forward flow or positioned in series with the ambient-side motive port of the aspirator during reverse flow), or when the ASOV is integral to the aspirator. Accordingly, depending on whether forward or reverse motive flow is expected to occur more frequently, the ASOV may be positioned either on the ambient side or the manifold side of the aspirator's throat.

As described above, typical ASOVs (including electrical solenoid valves, poppet valves, gate valves, etc.) may include a door or gate arranged in the motive flow path, and thus may be suited to unidirectional aspirator motive flow but not to bidirectional aspirator motive flow. For example, the opening of a door or gate of such an ASOV may be assisted by motive flow in one direction, but motive flow in an opposing direction may resist the opening of the ASOV's door or gate which may disadvantageously increase the amount of force which the ASOV's door or gate must exert to actuate in that direction (e.g., increasing power consumption by the ASOV if it is an electrically-actuated valve). Accordingly, in order to reduce pressure disruption caused by the ASOV during both forward motive flow and reverse motive flow through aspirator 150, ASOV 151 may be an electrically-actuated radial-flow shut-off valve. When a radial-flow shut-off valve is open, flow may pass through the valve in a direction perpendicular to the direction of motive flow. This may ensure that flow passing through the valve is not "against" a spring or electric actuator of the valve. As such, opening of ASOV 151 may not substantially disrupt pressure during both forward and reverse motive flow through aspirator 150.

FIG. 2 depicts ASOV 151 as a radial-flow shut-off valve. In sectional view B of FIG. 2, arrows 149 represent axes of radial flow of motive fluid into the valve. Arrows 149 are intended to depict the direction of radial flow into the valve only, and do not represent specific design parameters of the valve. For example, depending on the radial-flow shut-off valve used, radial flow may enter the valve via multiple ports arranged along a circumference of a portion of the valve disposed within passage 95 when the valve is open, or via a single continuous circumferential port of a portion of the valve arranged inside of passage 95. Other radial-flow shut-off valve designs may also be used without departing from the scope of this disclosure.

A tail of motive flow axis 147 may be seen in sectional view B. As shown, motive flow axis 147 is perpendicular to a plane containing arrows 149, such that the direction of radial flow into the valve is perpendicular to the direction of motive flow through the aspirator.

The state of ASOV 151 may be controlled by controller 50 based on various engine operating conditions. However, as an alternative, the ASOV may be a pneumatic (e.g., vacuum-actuated) valve; in this case, the actuating vacuum for the valve may be sourced from the intake manifold and/or vacuum reservoir and/or other low pressure sinks of the engine system. In embodiments where the ASOV is a pneumatically-controlled valve, control of the ASOV may be performed independent of a powertrain control module (e.g., the ASOV may be passively controlled based on pressure/vacuum levels within the engine system).

In the non-limiting examples described herein, ASOV 151 is a binary valve (e.g., a two-way valve). Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. However, in some examples ASOV 151 may be a continuously variable valve. In contrast to binary valves, continuously variable valves may be partially opened to varying degrees. Embodiments with continuously variable ASOVs may provide greater flexibility in control of the motive flow rate of the aspirator arrangement, with the drawback that continuously variable valves may be much more costly than binary valves.

As detailed herein (e.g., with respect to FIG. 7), the state of ASOV 151 may be adjusted based on a desired motive flow rate through aspirator 150, which may be based on various engine operating conditions. Depending on the relationship between CIP and MAP, the motive flow through the aspirator arrangement may be a forward flow, where the motive flow enters the ambient-side motive port of the aspirator arrangement and leaves the manifold-side motive port of the aspirator arrangement, or a reverse flow, where the motive flow enters the manifold-side motive port of the aspirator arrangement and leaves the ambient-side motive port of the aspirator arrangement. In one example, as described herein with respect to FIG. 5, the desired motive flow rate through the aspirator arrangement may depend upon MAP. In another example, as described herein with respect to FIG. 6, the desired motive flow rate through the aspirator arrangement may depend on compressor surge (e.g., such that the motive flow rate and/or amount through the aspirator arrangement increases with increasing compressor surge). It will be appreciated that references to adjustment of the ASOV herein may refer to either active control via controller 50 (e.g., as in the embodiment depicted in FIGS. 1-2 where the ASOV is a solenoid valves) or passive control based on a vacuum actuation threshold of the ASOV (e.g., in embodiments where the ASOV is a vacuum-actuated valve). Alternatively or additionally, the state of ASOV 151 may be adjusted based on a level of vacuum stored in vacuum reservoir 38, e.g. to increase motive flow through the aspirator arrangement responsive to an urgent need for vacuum replenishment when such operation is permissible in view of current engine operating conditions. Thus, by varying the motive flow through aspirator 150 via adjustment of the state of ASOV 151, an amount of vacuum drawn at the entraining port(s) of aspirator 150 may be modulated to meet engine vacuum requirements.

While the example engine system depicted in FIG. 1 includes an aspirator arrangement coupled to the intake passage downstream of air filter 33 and upstream of compressor 90, and further coupled to intake manifold 24, it will be appreciated that the "ambient side" of an aspirator arrangement such as aspirator arrangement 180 may alternatively be coupled to another part of the intake passage upstream of the compressor (e.g., it may be coupled upstream of air filter 33, etc.). Further, the "manifold side" of an aspirator arrangement such as aspirator arrangement 180 may alternatively be coupled to another part of the intake passage downstream of the compressor (e.g., upstream of main throttle 22, upstream of charge air cooler 26, etc.) in some examples.

Now referring to FIG. 3A, a detailed schematic view of suction flow into the bidirectional valved aspirator of FIG. 2 during boost conditions while the ASOV is open is provided. Specifically, a portion 300A of aspirator arrangement 180 of FIGS. 1-2 is shown in FIG. 3A; portion 300A corresponds to portion 300 of FIG. 2, and illustrates the path of suction flow in this portion of the aspirator arrangement during boost conditions while the ASOV is open.

During boost conditions, the compressor operates to pressurize intake air. Depending on the position of throttle 22, the pressure in intake manifold 24 may be higher than the pressure upstream of the compressor during these conditions. Accordingly, if the ASOV is controlled to be in an open position, the pressure differential between the intake manifold and the compressor inlet (e.g., ambient) induces a reverse motive flow through aspirator 150. During reverse motive flow, fluid (e.g., air) from the intake manifold flows to manifold-side motive port 157. Because the air entering manifold-side motive port 157 is pressurized at this time (e.g., it has a higher pressure than the pressure in the vacuum reservoir), check valve 74 remains closed and suction flow is not induced in passage 84. However, the pressure of the air drops as it passes through the throat of the aspirator due to the venturi effect, such that supersonic air is exhausted across ambient-side entraining port 156. The supersonic air creates a vacuum at port 156 (e.g., the pressure at port 156 is reduced to a level lower than the level in the vacuum reservoir), and as a result check valve 72 opens and suction flow is induced in passage 82.

Now referring to FIG. 3B, a detailed schematic view of suction flow into the bidirectional valved aspirator of FIG. 2 during non-boost conditions is provided. Specifically, a portion 300B of aspirator arrangement 180 of FIGS. 1-2 is shown in FIG. 3B; portion 300B corresponds to portion 300 of FIG. 2, and illustrates the path of suction flow in this portion of the aspirator arrangement during non-boost conditions.

During non-boost conditions, the compressor does not operate. Depending on engine operating conditions such as throttle position, CIP may be slightly higher than MAP. For example, during wide open throttle conditions, CIP may be only slightly higher than MAP, whereas during conditions where the throttle is substantially closed CIP may be substantially higher than MAP. Accordingly, if the ASOV is controlled to be in an open position, the pressure differential between the intake manifold and the compressor inlet (e.g., ambient) induces a forward motive flow through aspirator 150. During forward motive flow, fluid (e.g., air) from upstream of the compressor flows to ambient-side motive port 153 by way of passage 95. Because the air entering ambient-side motive port 153 is at approximately ambient pressure (e.g., it has a higher pressure than the pressure in the vacuum reservoir), check valve 72 remains closed and suction flow is not induced in passage 82. However, the pressure of the air drops as it passes through the throat of the aspirator due to the venturi effect, such that supersonic air is exhausted across manifold-side entraining port 154. The supersonic airflow creates a vacuum at port 154 (e.g., the pressure at port 154 is reduced to a level lower than the level in the vacuum reservoir), and as a result check valve 74 opens and suction flow is induced in passage 84, as shown.

In one example, during non-boost conditions where the throttle is in a wide open position (WOT), MAP may be only 1" mercury below ambient, and thus the intake manifold alone may an insufficient vacuum source for vacuum reservoir (e.g., brake booster). Forward motive flow through aspirator 150 during such conditions may advantageously achieve a pressure of 3-4" mercury below ambient in passage 84 and thus in the vacuum reservoir.

As shown in FIGS. 3A-B, suction flow occurs in only one of passages 82 and 84 at a given time. Accordingly, during either reverse or forward motive flow through aspirator arrangement 180, suction flow only passes through a single check valve while traveling between the vacuum source and the aspirator, which may advantageously reduce pressure losses (e.g., as compared to pressure losses in systems where such suction flow must pass through multiple check valves). The inclusion of bypass passage 43 and check valve 41 enables such operation; during conditions where pressure at the vacuum source (e.g. the vacuum reservoir in the embodiment depicted herein) exceeds intake manifold pressure, check valve 41 opens and excess pressure in the vacuum reservoir is evacuated into the intake manifold via bypass passage 43.

Figure 4:
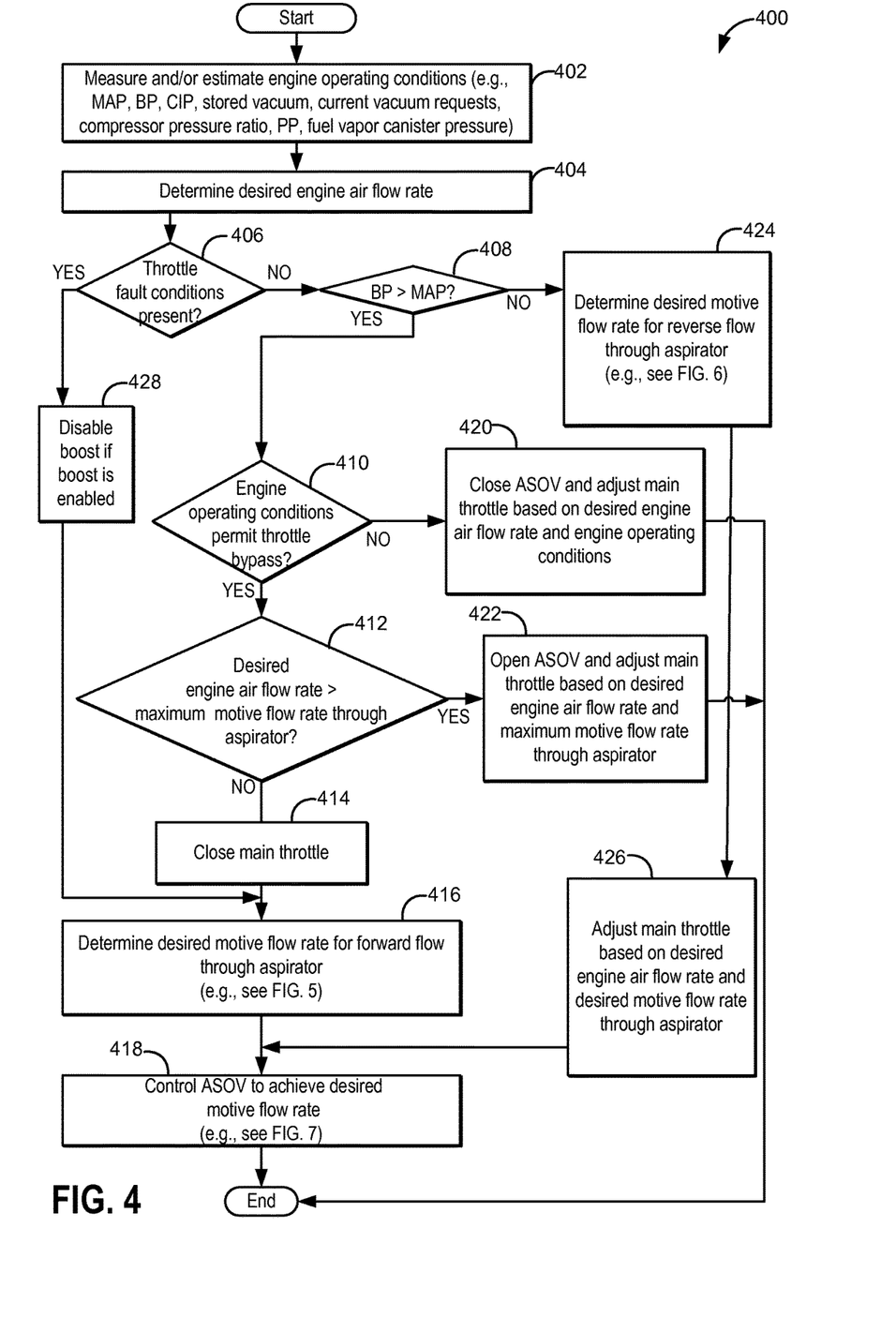
FIG. 4 shows a high level flow chart illustrating a routine that may be implemented in conjunction with the engine system of FIG. 1 and aspirator arrangement of FIG. 2 for controlling the operation of an aspirator shut-off valve and an intake throttle to achieve a desired motive flow rate through the bidirectional valved aspirator.

Now referring to FIG. 4, an example method 400 for controlling the ASOV and intake throttle of the engine system of FIG. 1 to achieve a desired motive flow rate through the aspirator arrangement is shown. The method of FIG. 4 may be used in conjunction with the methods of FIGS. 5-6, for example.

At 402, method 400 includes measuring and/or estimating engine operating conditions. Engine operating conditions may include, for example, MAP/MANVAC, BP, CIP, vacuum needs (e.g., based on a level of vacuum stored in the vacuum reservoir and/or current vacuum requests), engine load, engine speed, engine temperature, exhaust gas composition, catalyst temperature, compressor surge (e.g., based on sensed compressor pressure ratio), boost level, PP, MAF, ambient conditions (temperature, pressure, humidity), etc.

After 402, method 400 proceeds to 404. At 404, method 400 includes determining desired engine air flow rate. For example, desired engine air flow rate may be determined based on engine operating conditions, e.g. MAP/MANVAC, a torque request from a vehicle operator, brake pedal position, etc.

After 404, method 400 continues to 406. At 406, method 400 includes determining whether throttle fault conditions are present. In one non-limiting example, controller 50 may set a flag when diagnostic procedures indicate failure of the electronic throttle control system, and the determination of whether throttle fault conditions are present may include checking whether this flag is set. Alternatively, the determination may be made based on readings from the MAP sensor, MAF sensor(s), and/or various other sensors.

If the answer at 406 is NO, this indicates that throttle fault conditions are not present (e.g., electronic throttle control is functioning correctly), and method 400 proceeds to 408. At 408, method 400 includes determining whether BP is greater than MAP. This determination may be made at controller 50 based on signals received from BP sensor 59 and MAP sensor 60, for example. The relationship between BP and MAP may determine whether forward flow or reverse flow through the aspirator arrangement is achievable via control of the state of the ASOV.

If the answer at 408 is YES, indicating that BP is greater than MAP, method 400 proceeds to 410. At 410, method 400 includes determining whether engine operating conditions permit throttle bypass. For example, during certain engine operating conditions, engine air flow requirements may be such that it necessary to maintain a fully open throttle with no throttle bypass. Alternatively, during other engine operating conditions, it may be desirable to divert intake air flow through an aspirator arrangement to thereby generate vacuum for consumption by vacuum consumers of the engine system while avoiding throttling losses.

If the answer at 410 is YES, indicating that engine operating conditions do permit throttle bypass, method 400 proceeds to 412 to determine whether the desired engine air flow rate (e.g., as determined at 404) is greater than a maximum motive flow rate through the aspirator arrangement. For example, if the maximum motive flow rate through the aspirator arrangement is less than a desired engine air flow rate, it may be necessary to allow some air flow to pass through the intake throttle to achieve the desired engine air flow rate.

If the answer at 412 is NO, the desired engine air flow rate is not greater than the maximum motive flow rate through the aspirator arrangement, and thus the main throttle may be closed at 414, to enable all intake air to bypass the compressor. After 414, method 400 proceeds to 416 to determine a desired motive flow rate for forward flow through the aspirator arrangement, for example in accordance with the method shown in FIG. 5 and described below. After 416, method 400 proceeds to 418 to control the ASOV to achieve the desired motive flow rate, for example in accordance with the method shown in FIG. 7 and described below. After 418, method 400 ends.

Returning to 412, if the desired engine air flow rate is greater than the maximum motive flow rate through the aspirator, the answer is YES, and method 400 proceeds to 422. At 422, method 400 includes opening the ASOV and adjusting the main throttle based on the desired engine air flow rate and the maximum motive flow rate through the aspirator. Adjusting the main throttle based on the desired engine air flow rate and the maximum motive flow rate through the aspirator arrangement may include at least partially opening the intake throttle such that a difference between the maximum motive flow rate through the aspirator and the desired engine air flow rate may be provided by air flow throttled by the intake throttle. After 422, method 400 ends.

Returning to 410, if the answer is NO indicating that engine operating conditions do not permit throttle bypass (e.g., all intake air must pass through the throttle), method 400 proceeds to 420. Engine operating conditions may not permit throttle bypass during conditions where a wide open throttle position is necessary and where any lag associated with the flow restriction of the aspirator is unacceptable. As another example, if the control system diagnoses a fault in the ASOV, this may constitute an engine operating condition wherein throttle bypass is not permitted. At 420, method 400 includes closing the ASOV and adjusting the main throttle based on the desired engine air flow rate and engine operating conditions. In some examples, this may include increasing opening of the throttle as a pressure exerted on an accelerator pedal by a vehicle operator increases (e.g., as indicated by PP). After 420, method 400 ends.

Returning to 408, if the answer is NO (e.g., indicating that the engine is operating with boost), method 400 proceeds to 424. At 424, method 400 includes determining a desired motive flow rate for reverse flow through the aspirator, for example in accordance with the method of FIG. 6.

After 424, method 400 proceeds to 426. At 426, method 400 includes adjusting the main throttle based on the desired engine air flow rate and the desired motive flow rate through the aspirator (e.g., similar to step 722). After 426, method 400 proceeds to 418 to control the ASOV to achieve the desired motive flow rate through the aspirator, as described above.

Therefore, in accordance with method 400, a method for an engine system may include, during a throttle fault, disabling boost and directing intake air through a valved aspirator bypassing an intake compressor and having a first entraining port coupling an ambient side of the aspirator with a vacuum source and a second entraining port coupling a manifold side of the aspirator with the vacuum source, the first entraining port counter sunk relative to a nominal slope of the aspirator. Directing intake air through the aspirator comprises opening a radial flow aspirator shut-off valve arranged in series with the aspirator upstream of an ambient-side motive port of the aspirator, motive flow may enters the aspirator shut-off valve in a direction perpendicular to a motive flow axis of the aspirator when the aspirator shut-off valve is open, as described above with reference to FIG. 2 and as show in sectional view B of FIG. 2.

Figure 5:
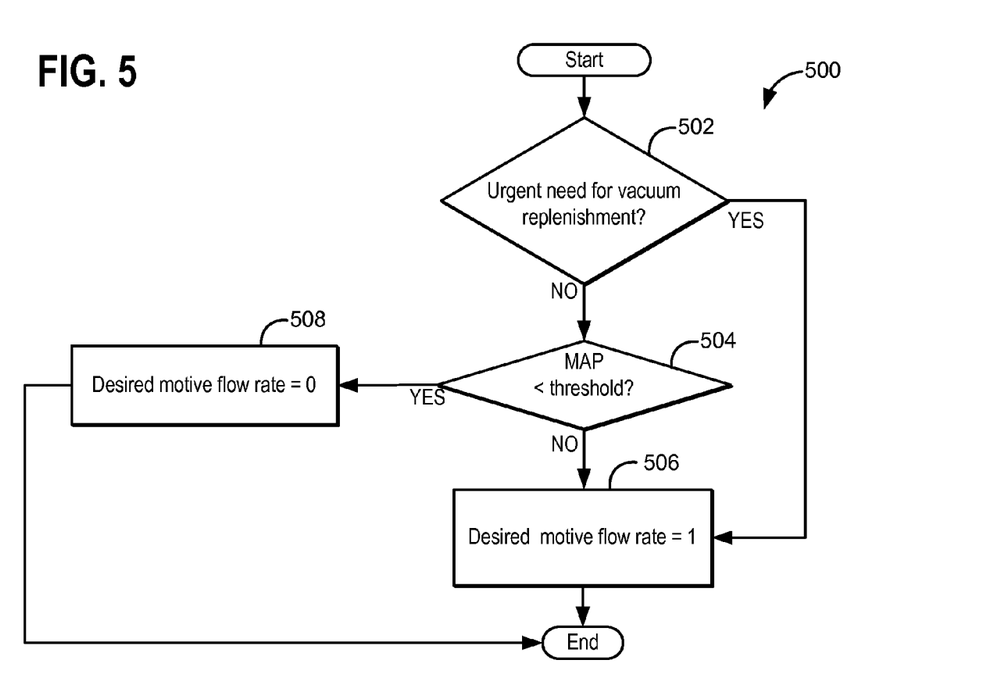
FIG. 5 shows a high level flow chart illustrating a routine that may be implemented for determining a desired motive flow rate through a bidirectional valved aspirator during non-boost conditions, for use in conjunction with the methods of FIGS. 4 and 7.
Figure 7:
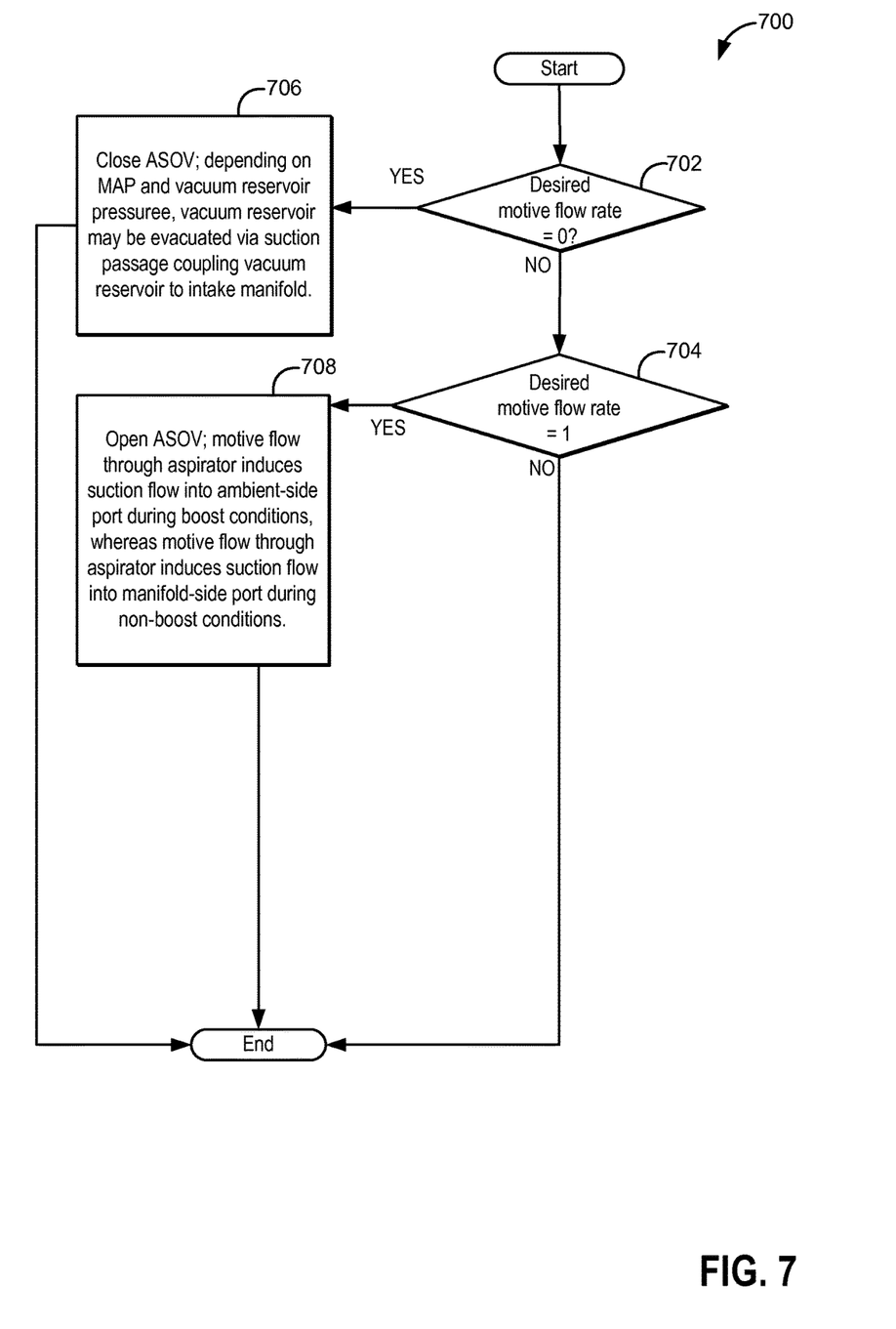
FIG. 7 shows a high level flow chart illustrating a routine that may be implemented for controlling aspirator shut-off valves, which may be used in conjunction with the methods of FIGS. 4-6.

Now referring to FIG. 5, an example method 500 is provided for determining a desired motive flow rate through a bidirectional valved aspirator during non-boost conditions, for use in conjunction with the methods of FIGS. 4 and 7. For example, method 500 may be performed at step 416 of method 400 of FIG. 4. It will be appreciated that during non-boost conditions, the desired motive flow rate through the aspirator pertains is a rate of forward flow through the aspirator (e.g., a rate of motive flow from the ambient side to the manifold side of the aspirator).

At 502, method 500 includes determining whether there is an urgent need for vacuum replenishment. This determination may be based on a level of stored vacuum in the vacuum reservoir (e.g., as sensed by sensor 40 of FIG. 1), current vacuum requests (e.g., based on brake pedal position), MAP (e.g., as sensed by sensor 60 of FIG. 1), pressure in an fuel vapor canister of a fuel vapor purge system (e.g., as sensed by sensor 49 of FIG. 1), etc.

If the answer at 502 is NO, method 500 proceeds to 504. At 504, it is determined whether MAP is less than a threshold. In one non-limiting example, the threshold may be −40 kPa (e.g., equivalent to a MANVAC of 40 kPA). If MAP is less than the threshold, the answer at 504 is YES, and method 500 proceeds to 508 where the desired motive flow rate is set to 0. While a motive flow rate of 0 may represent no motive flow through the aspirator in the case of a binary ASOV, it will be appreciated that in examples where the ASOV is a continuously variable valve or another type of valve adjustable to other positions in addition to open and shut, a motive flow rate of 0 may correspond to a first level of motive flow which may be lower than a second level of motive flow. After 508, method 500 ends.

Otherwise, if the answer at 504 is NO, indicating that MAP is greater than or equal to the threshold, method 500 proceeds to 506 where the desired motive flow rate is set to 1. A motive flow rate of 1 may correspond to a maximum motive flow rate through the aspirator in the case of a binary ASOV. If the ASOV is controllable to other positions in addition to open and shut positions, however, a motive flow rate of 1 may correspond to a second level of motive flow including at least some motive flow through the aspirator. After 506, method 500 ends.

Returning to step 502, if the answer is YES indicating that there is an urgent need for vacuum replenishment, method 500 proceeds to 506 to set the desired motive flow rate to 1. After 506, method 500 ends.

Figure 6:
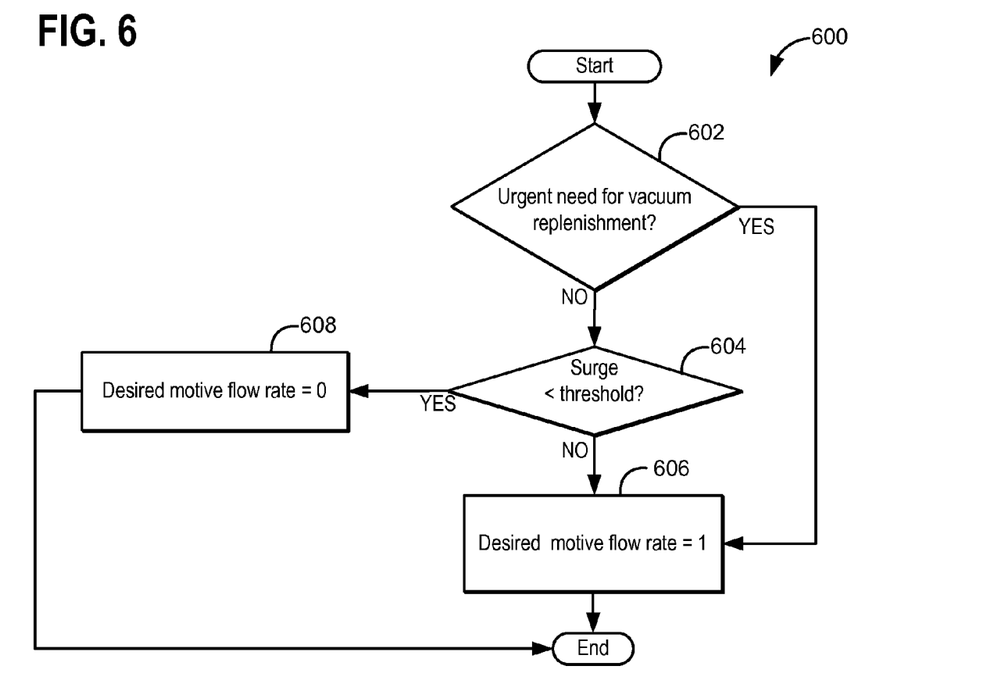
FIG. 6 shows a high level flow chart illustrating a routine that may be implemented for determining a desired motive flow rate through a bidirectional valved aspirator during boost conditions, for use in conjunction with the methods of FIGS. 4 and 7.

Now referring to FIG. 6, an example method 600 is provided for determining a desired motive flow rate through a bidirectional valved aspirator during boost conditions, for use in conjunction with the methods of FIGS. 4 and 7. For example, method 600 may be performed at step 424 of method 400 of FIG. 4. It will be appreciated that during boost conditions, the desired motive flow rate through the aspirator pertains is a rate of reverse flow through the aspirator (e.g., a rate of motive flow from the manifold side to the ambient side of the aspirator).

At 602, method 600 includes determining whether there is an urgent need for vacuum replenishment, for example in the manner discussed above with regard to step 502 of method 500. After 602, method 600 proceeds to 604.

At 604, method 600 includes determining whether compressor surge is less than a threshold. This may include, for example, determining a likelihood of compressor surge being less than the threshold before an actual occurrence of surge. Alternatively, the indication of surge may include an actual occurrence of surge less than the threshold. The determination may be based on various sensed parameter values, such as values from CIP sensor 68 and MAP sensor 60. For example, a pressure differential between MAP and CIP may be indicative of the likelihood of surge and/or current surge level. The threshold may be correspond to a minimum level at which surge is problematic, and thus when surge is less than the threshold, it may not be desirable to recirculate air from downstream of the compressor to upstream of the compressor via the aspirator.

If the answer at 604 is YES, method 600 proceeds to 608 where the desired motive flow rate is set to 0. As described above for step 508 of method 500, while a motive flow rate of 0 may represent no motive flow through the aspirator in the case of a binary ASOV (and thus no recirculation of air from downstream of the compressor to upstream of the compressor by way of the aspirator arrangement), it will it may instead correspond to a first level of motive flow which may be lower than a second level of motive flow in examples where the ASOV is a continuously variable valve or other similar valve. After 608, method 1000 ends.

Otherwise, if the answer at 604 is NO, indicating that compressor surge is greater than or equal to the threshold, method 600 proceeds to 606 where the desired motive flow rate is set to 1. As described above for step 506 of method 500, a motive flow rate of 1 may correspond to a maximum motive flow rate through the aspirator in the case of a binary ASOV, whereas if the ASOV is controllable to other positions in addition to open and shut positions, a motive flow rate of 1 may correspond to a second level of motive flow including at least some motive flow through the aspirator. After 606, method 600 ends.

Now referring to FIG. 7, an example method 700 for controlling an ASOV such as ASOV 151 of the engine system depicted in FIG. 1 is shown. Method 700 may be performed at step 418 of method 400, for example.

At 702, method 700 includes determining whether the desired motive flow rate is equal to 0. If the answer at 702 is YES, method 700 proceeds to 706 to close the ASOV. Closing the ASOV may be an active process in embodiments where the ASOV is a solenoid valve and is controlled by a controller such as controller 50 of FIG. 1. For example, if the ASOV is a binary valve, closing the ASOV may include fully closing the ASOV, whereas if the ASOV is a continuously variable valve, closing the ASOV may include either partially or fully closing the ASOV. Depending on MAP and vacuum reservoir pressure, when the ASOV is closed, the vacuum reservoir may be evacuated via a suction passage coupling vacuum reservoir to intake manifold, such as bypass passage 43 shown in FIGS. 1-2. After 706, method 700 ends.

Otherwise, if the answer at 702 is NO, method 700 proceeds to 704. At 704, method 700 includes determining whether the desired motive flow rate is equal to 1. If the answer at 704 is YES, method 700 proceeds to 708 to open the ASOV. Opening the ASOV may be an active process in embodiments where the ASOV is a solenoid valve and is controlled by a controller such as controller 50 of FIG. 1. For example, if the ASOV is a binary valve, opening the ASOV may include fully opening the ASOV, whereas if the ASOV is a continuously variable valve, opening the ASOV may include either partially or fully opening the ASOV. Further, when the ASOV is opened at 708, motive flow through aspirator induces suction flow into ambient-side port during boost conditions (as shown in FIG. 3A), whereas motive flow through the aspirator induces suction flow into manifold-side port during non-boost conditions (as shown in FIG. 3B). After 708, method 700 ends.

Returning to 704, if the answer is NO, method 700 ends.

Therefore, in accordance with the methods of FIGS. 4-7, a radial-flow ASOV may be controlled based on engine vacuum needs and intake manifold pressure. For example, during non-boost conditions, the ASOV may be opened when intake manifold pressure is greater than a threshold, and during boost conditions, the ASOV may be opened when compressor surge is greater than a threshold. Further, the ASOV may be opened responsive to an urgent need for vacuum replenishment during both boost and non-boost conditions. Furthermore, when the ASOV is open, suction flow may enters one or more of first, second, and third passages based on intake manifold pressure and vacuum reservoir pressure; the first passage may be passage 82 of FIGS. 1-2, the second passage may be passage 84 of FIGS. 1-2, and the third passage may be passage 43 of FIGS. 1-2. For example, when the ASOV is open, suction flow may enter the second passage but not the first passage when intake manifold pressure less than a threshold, suction flow may enter the first passage but not the second passage when intake manifold pressure is greater than the threshold, and suction flow may enter the third passage when vacuum reservoir pressure is greater than intake manifold pressure. Still further, a fourth passage (e.g., passage 86 of FIG. 1) may couple a fuel vapor purge system with the first and second passages when a canister purge valve (e.g., valve 65 of FIG. 1) arranged in the fourth passage is open. When the canister purge valve is open and the aspirator shut-off valve is open, suction flow may enter the fourth passage based on intake manifold pressure and fuel vapor canister pressure.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for an engine, comprising:
during a throttle fault, disabling boost and directing intake air through a valved aspirator bypassing an intake compressor and having a first entraining port coupling an ambient side of the aspirator with a vacuum source and a second entraining port coupling a manifold side of the aspirator with the vacuum source, the first entraining port counter sunk relative to a nominal slope of the aspirator.

2. The method of claim 1, wherein directing intake air through the aspirator comprises opening a radial flow aspirator shut-off valve arranged in series with the aspirator upstream of an ambient-side motive port of the aspirator, and wherein motive flow enters the aspirator shut-off valve in a direction perpendicular to a motive flow axis of the aspirator when the aspirator shut-off valve is open.

3. The method of claim 2, further comprising, when a throttle is operating correctly, controlling the aspirator shut-off valve based on engine vacuum needs and at least one of intake manifold pressure and a compressor surge level.

4. The method of claim 3, wherein controlling the aspirator shut-off valve based on engine vacuum needs and intake manifold pressure includes:
during non-boost conditions, opening the aspirator shut-off valve when intake manifold pressure is greater than a threshold; and
during boost conditions, opening the aspirator shut-off valve when compressor surge is greater than a threshold.

5. The method of claim 4, further comprising opening the aspirator shut-off valve responsive to an need for vacuum replenishment determined based on pressure in a fuel vapor canister of a fuel vapor purge system during boost and non-boost conditions.

6. A method for an engine, comprising:
adjusting a motive flow rate through a valved aspirator bypassing an intake compressor and having a first entraining port coupling an ambient side of the aspirator with a vacuum source and a second entraining port coupling a manifold side of the aspirator with the vacuum source, the first entraining port counter sunk relative to a nominal slope of the aspirator, based on engine vacuum needs and at least one of intake manifold pressure and a compressor surge level.

7. The method of claim 6, wherein adjusting the motive flow rate through the aspirator comprises adjusting a radial flow aspirator shut-off valve arranged in series with the aspirator upstream of an ambient-side motive port of the aspirator, and wherein motive flow enters the aspirator shut-off valve in a direction perpendicular to a motive flow axis of the aspirator when the aspirator shut-off valve is open.

8. The method of claim 7, further comprising:
during non-boost conditions, opening the aspirator shut-off valve when intake manifold pressure is greater than a threshold; and
during boost conditions, opening the aspirator shut-off valve when compressor surge is greater than a threshold.

9. The method of claim 8, further comprising opening the aspirator shut-off valve responsive to an need for vacuum replenishment determined based on pressure in a fuel vapor canister of a fuel vapor purge system during boost and non-boost conditions.

10. The method of claim 8, wherein the aspirator also bypasses a main throttle arranged downstream of the intake compressor and upstream of an intake manifold, and wherein the method further comprises adjusting the main throttle based on a desired engine air flow rate.

* * * * *